United States Patent
Reibman

(10) Patent No.: US 8,451,907 B2
(45) Date of Patent: May 28, 2013

(54) METHODS AND APPARATUS TO DETECT TRANSPORT FAULTS IN MEDIA PRESENTATION SYSTEMS

(75) Inventor: Amy Ruth Reibman, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1271 days.

(21) Appl. No.: 12/202,839

(22) Filed: Sep. 2, 2008

(65) Prior Publication Data

US 2010/0054340 A1    Mar. 4, 2010

(51) Int. Cl.
*H04N 11/02*    (2006.01)

(52) U.S. Cl.
USPC .................................. 375/240.25

(58) Field of Classification Search
USPC ...... 375/240–240.01, 240.07, 240.26–240.27
See application file for complete search history.

(56) References Cited

U.S. PATENT DOCUMENTS

| | | | |
|---|---|---|---|
| 2,898,453 A | | 8/1959 | Seidler |
| 5,442,400 A * | | 8/1995 | Sun et al. ............ 375/240.15 |
| 5,668,601 A * | | 9/1997 | Okada et al. .......... 375/240.25 |
| 5,684,710 A | | 11/1997 | Ehlers et al. |
| 5,970,459 A * | | 10/1999 | Yang et al. ................ 704/276 |
| 6,072,984 A | | 6/2000 | Barringer |
| 6,229,854 B1 * | | 5/2001 | Kikuchi et al. ........ 375/240.27 |
| 6,414,960 B1 | | 7/2002 | Kuhn et al. |
| 6,618,077 B1 | | 9/2003 | Baina et al. |
| 6,683,988 B1 * | | 1/2004 | Fukunaga et al. ............ 382/236 |
| 6,937,658 B1 * | | 8/2005 | Suito et al. ............... 375/240.15 |
| 6,988,238 B1 * | | 1/2006 | Kovacevic et al. ............ 714/799 |
| 7,154,533 B2 | | 12/2006 | Sheldon et al. |
| 8,107,539 B2 * | | 1/2012 | Hannuksela et al. .... 375/240.26 |
| 2003/0058224 A1 * | | 3/2003 | Ushimaru ..................... 345/169 |
| 2003/0236905 A1 | | 12/2003 | Choi et al. |
| 2004/0125877 A1 * | | 7/2004 | Chang et al. ............. 375/240.28 |
| 2004/0260723 A1 | | 12/2004 | Brooks et al. |
| 2006/0217936 A1 | | 9/2006 | Mason et al. |
| 2007/0006268 A1 * | | 1/2007 | Mandera et al. ................ 725/80 |
| 2007/0183369 A1 * | | 8/2007 | Angelis ......................... 370/332 |
| 2008/0084934 A1 * | | 4/2008 | Agrawal .................. 375/240.27 |

* cited by examiner

*Primary Examiner* — David Czekaj
*Assistant Examiner* — Leron Beck
(74) *Attorney, Agent, or Firm* — Hanley, Flight & Zimmerman, LLC

(57) ABSTRACT

Example methods and apparatus to detect transport faults in media presentation systems are disclosed. An example method comprises decoding a media stream to form audio data and pixel data, computing a first value representative of the media stream using pixel data associated with a first set of the video frames, computing a second value representative of the media stream using pixel data associated with a second set of the video frames, computing a third value representative of first speech in a first segment of the audio data, computing a fourth value representative of second speech in a second segment of the audio data, determining a fifth value representative of a likelihood that a transport failure has affected the media stream, the fifth value determined using the first, second, third and fourth values, and comparing the fifth value to a threshold to determine whether to generate a transport failure alert.

20 Claims, 4 Drawing Sheets

US 8,451,907 B2

METHODS AND APPARATUS TO DETECT TRANSPORT FAULTS IN MEDIA PRESENTATION SYSTEMS

FIELD OF THE DISCLOSURE

This disclosure relates generally to media presentations systems and, more particularly, to methods and apparatus to detect transport faults in media presentation systems.

BACKGROUND

Media presentations systems provide and/or distribute media content (e.g., video, audio, images, web pages, etc.) to consumer locations. An example media presentation system is an Internet protocol (IP) television (IPTV)-based system that provides media content over a broadband network. In general, an IPTV provider receives media content from media content creators. The IPTV provider converts the media content into packetized digital media streams. The packetized digital media streams are distributed to consumer locations via one or more servers and/or distribution nodes of an IP-based network. Each of the consumer locations includes at least one consumer device that receives the packetized digital media streams and converts the streams into media content suitable for display on a device such as a television or computer. The consumer device can often transmit data back to the IPTV provider over, for example, the IP-based network. In other words, the IPTV provider and the consumer device can often engage in a two-way communication.

DETAILED DESCRIPTION

Figure 1:
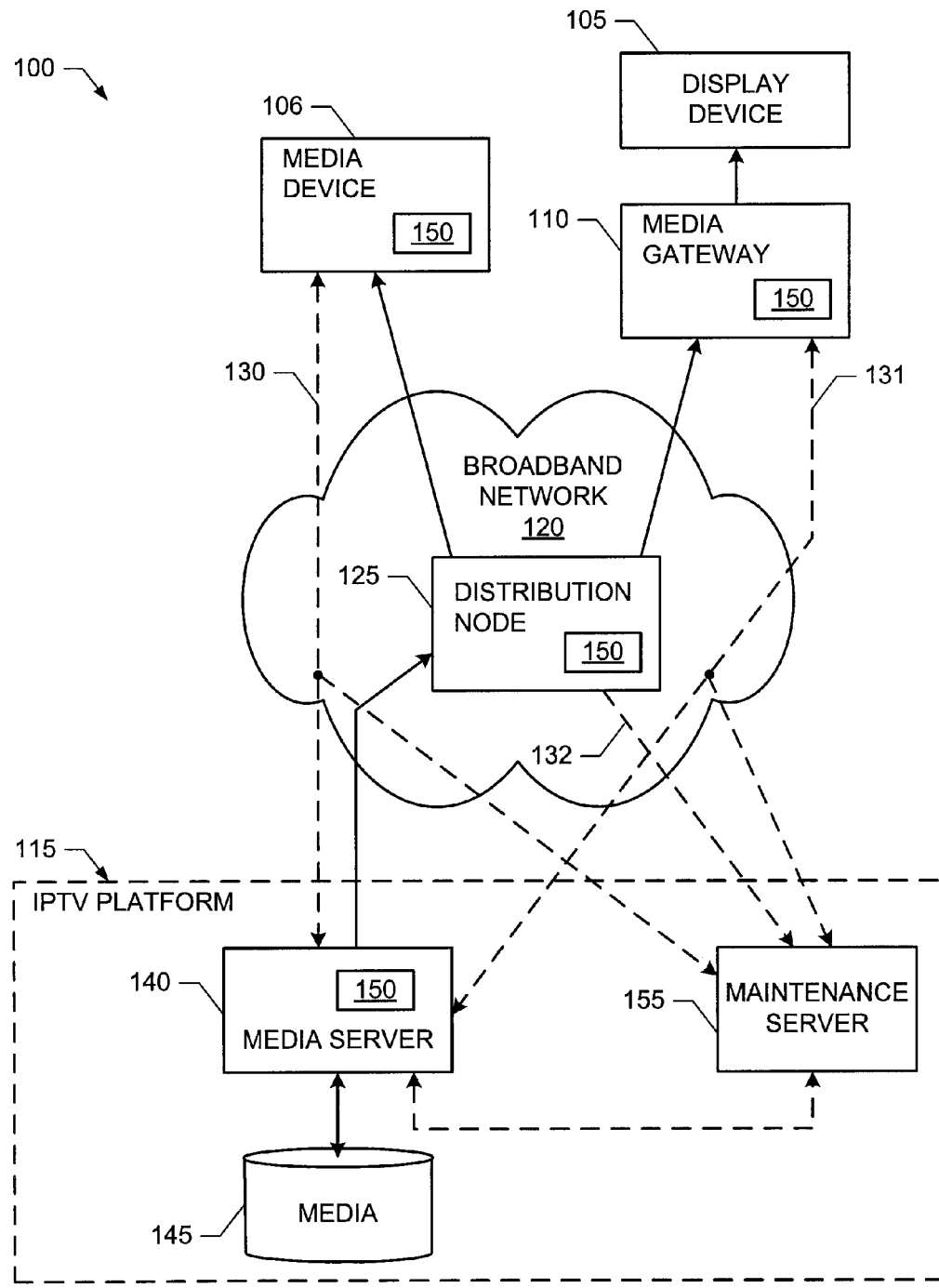
FIG. 1 is a schematic illustration of an example IPTV-based media presentation system constructed in accordance with the teachings of this disclosure.

Example methods and apparatus to detect transport faults in media presentation systems are disclosed. A disclosed example method includes decoding a media stream to form audio data and pixel data for each of a plurality of video frames, computing a first value representative of the media stream over a first set of the video frames using pixel data associated with the first set of the video frames, computing a second value representative of the media stream over a second set of the video frames using pixel data associated with the second set of the video frames, computing a third value representative of first speech in a first segment of the audio data, computing a fourth value representative of second speech in a second segment of the audio data, determining a fifth value representative of a likelihood that a transport failure has affected the media stream, the fifth value determined using the first, second, third and fourth values, and comparing the fifth value to a threshold to determine whether to generate a transport failure alert.

A disclosed example apparatus includes a video decoder to decode a media stream to form pixel data for each of a plurality of video frames, an audio decoder to decode the media stream to form audio data, a motion continuity detector to compute a first value representative of the media stream over a first set of the video frames using pixel data associated with the first set of the video frames, and a second value representative of the media stream over a second set of the video frames using pixel data associated with the second set of the video frames, a speech continuity detector to compute a third value representative of first speech in a first segment of the audio data, and a fourth value representative of second speech in a second segment of the audio data, and a failure decision controller to determine a fifth value representative of a likelihood that a transport failure has affected the media stream, the fifth value determined using the first, second, third and fourth values, and comparing the fifth value to a threshold to determine whether to generate a transport failure alert.

Another disclosed example method includes computing a first value representative of first motion in a first segment of a video stream, computing a second value representative of second motion in a second segment of the video stream, determining a third value representative of a likelihood that a transport failure has affected the video stream, the third value determined using the first and second values, and comparing the third value to a first threshold to determine whether to generate a transport failure alert.

In the interest of brevity and clarity, throughout the following disclosure references will be made to detecting transport faults in an example Internet protocol (IP) television (IPTV) based media presentation system 100 of FIG. 1. However, the methods and apparatus described herein to detect transport faults are applicable to other types of media presentation systems, such as a coaxial cable distribution system, a terrestrial broadcast system (analog and/or digital), a satellite or extra-terrestrial broadcast system, or any combination thereof.

FIG. 1 is a schematic illustration of the example IPTV-based media presentation system 100 including any number and/or type(s) of display devices, two of which are designated at reference numerals 105 and 106. Example display devices 105 and 106 include, but are not limited to, a television, a computer monitor, a computer, a handheld media device, and/or a smartphone. The example display devices 105 and 106 of FIG. 1 may be implemented and/or be found at any number and/or type(s) of locations, such as a residence or a place of business. Further, the example display devices 105 and 106 may be a fixed location device, a substantially fixed location device and/or a mobile device. Moreover, the display devices 105 and 106 may have equipment communicatively and/or electrically coupled to them. For example, a television 105 may be communicatively coupled to a media gateway 110. In some examples, a display device 106 may include some or all of the functionality of a media gateway 110. In such examples, the media device 106 implements both display device and media gateway functionality. For instance, an example smartphone 106 is able to receive a media stream via a broadband network 120, decode the media stream, and present the content represented by the media stream at the smartphone 106.

To present and/or display media (e.g., movies, televisions shows, sporting events, news programs, audio tracks, images, etc.) at a display device 105 such as a television, the example IPTV-based media presentation system 100 of FIG. 1 includes any number and/or types of media gateways (one of which is designated at reference numeral 110) and an IPTV platform 115. In some examples, the example media gateway 110 of FIG. 1 comprises an IPTV-based set-top box (STB). Additionally or alternatively, a media gateway 110 may be implemented within and/or by a device, such as a smartphone 106, that also includes a display device.

The example IPTV platform 115 of FIG. 1 provides media (e.g., video, images and/or audio data), user interfaces and/or program guides to the example media gateway 110 and/or the example media device 106 via the broadband network 120. The example broadband network 120 of FIG. 1 may be implemented by any number and/or type(s) of private and/or public IP-based networks, such as the Internet. Likewise, the example media gateway 110 and/or the example media device 106 of FIG. 1 provide user selections and/or inputs made via the display device 105, the media device 106 and/or the media gateway 110 to the IPTV platform 115 via the broadband network 120. For example, the IPTV platform 115 can provide user interface data to the media gateway 110 and/or the media device 106 (e.g., encoded as a motion pictures expert group (MPEG) encoded video stream). The media gateway 110 and/or the media device 106 subsequently decode and present a corresponding user interface (e.g., a program guide menu) at the display device 105 and/or the media device 106. In response to a presented user interface, a user can provide a user input and/or selection to the media gateway 110 or media device 106 (e.g., by pressing one or more buttons of a remote control device or keypad to chose a particular program to view), which subsequently sends the user input and/or selection to the IPTV platform 115. The example IPTV platform 115 sends the selected program to the media gateway 110 or the media device 106 for presentation at the display device 105 or the media device 106.

The example IPTV platform 115 of FIG. 1 distributes media and/or user interface data to the example media gateway 110 and/or the example media device 106 via any number and/or type(s) of IPTV-based distribution nodes of the broadband network 120 and/or the IPTV platform 115, one of which is designated at reference numeral 125. The example IPTV platform 115 receives user inputs, user selections and/or transport failure alerts from the example media device 106 and/or the example media gateway 110 via any number and/or type(s) of backchannel communication paths 130, 131 and 132 of the example broadband network 120. The example backchannel communication paths 130-132 of FIG. 1 are implemented via a public IP-based network, such as the Internet. The example backchannel communication paths 130-132 do not include the IPTV-based distribution nodes 125 so that, even when a network transport failure affects one or more of the example distribution nodes 125, the backchannel communication paths 130-132 can be used to provide transport failure alerts to the IPTV platform 115.

The example broadband network 120 of FIG. 1 may be implemented in accordance with any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks. The example media device 106 and/or the example media gateway 110 may be communicatively coupled to the broadband network 120 via any number of private and/or public networks and/or communication devices (not shown), such as a router, a modem, and/or a local area network (LAN). For instance, the example media device 106 and/or the example media gateway 110 may be coupled to the broadband network 120 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Moreover, the broadband network 120 of FIG. 1 may extend geographically to include one or more locations near to and/or encompassing the media device 106 and/or the media gateway 110. For example, the broadband network 120 may include a wireless access point (not shown) by which, for example, the media device 106 and/or the media gateway 110 connect to the broadband network 120 and the IPTV platform 115.

To provide media to the media gateway 110 and/or the media device 106, the example IPTV platform 115 of FIG. 1 includes any number and/or type(s) of media servers, one of which is designated at reference numeral 140. When a user of the media gateway 110 and/or the media device 106 chooses to view a particular program, the example media server 140 retrieves the media stream corresponding to the selected program from a media database 145, and provides the media stream retrieved from the media database 145 to the requesting media gateway 106, 110, which decodes and presents the same at the display device 105 and/or the media device 106.

To detect network transport failures, the example IPTV-based media presentation system 100 of FIG. 1 includes one or more failure detection modules 150. A failure detection module 150 may be implemented by any or all of the example media gateways 110, the example media devices 106, the example distribution nodes 125 and/or the example media servers 140 of FIG. 1. The example failure detection modules 150 of FIG. 1 detect network transport failures by identifying and/or using one or more characteristics of a media stream that are indicative of a probable network transport failure. Example characteristics include, but are not limited to, an abrupt change in motion rate within a scene, an abrupt change in motion rate not associated with a change in scene, an interrupted spoken word, an abrupt change in luminance, an abrupt change in volume and/or a lack of audio content. An example network transport failure results in a first portion of video having a motion vector representative of high-motion video (e.g., a motion vector exceeding a threshold) followed by a second portion having a motion vector representative of still-motion video (e.g., a motion vector not exceeding a substantially lower threshold), where the first and second portions were not identified as belonging to different scenes. That is, the first and second portions represent an abrupt change in motion rate within a scene. The example network transport failure also causes a substantially simultaneous interruption of a spoken word and/or an abrupt decrease in volume. Such changes are generally not associated with intentional cinematography effects such as fade to black. To reduce the likelihood of identifying an intentional cinematography effect as a network transport failure, the example failure detection modules 150 of FIG. 1 utilize two or more characteristics to identify a network transport failure. For example, a set of characteristics can be individually used to make separate transport failure determinations and then combined using majority voting, or a set of characteristics (e.g., a difference between two motion vectors, and a speech discontinuity indicator) can be combined as a weighted sum of the characteristics with the sum compared to a threshold. In some examples, a sum of the weights used to compute a weighted sum may be less than or equal to one. An example manner of implementing any or all of the example failure detection modules 150 of FIG. 1 is described below in connection with FIG. 2.

When any of the example failure detection modules 150 of FIG. 1 determine or detect that a network transport failure has or is likely to have occurred, the failure detection module 150 generates and/or sends a transport failure alert to a maintenance server 155 of the IPTV platform 115 via one of the example backchannel communication paths 130-132.

Using any number and/or type(s) of method(s), logic, rule(s) and/or algorithm(s), the example maintenance server 155 of FIG. 1 processes transport failure alerts received from the example failure detection modules 150 to identify the root cause(s) leading to the received alert(s). For example, when alerts are received from multiple media gateways 110 that receive media content via a particular distribution node 125 (e.g., all of the media gateways 110 are located in a particular geographic area), the maintenance server 155 identifies that particular distribution node 125 as potentially having a fault condition that needs to be repaired. When a root cause is identified, the example maintenance server 155 creates and/or submits a trouble ticket so that a repair technician (not shown) is dispatched to repair or rectify the suspected cause of the reported network transport failure(s). The transport failure alerts can also be analyzed to identify periodic and/or aperiodic recurring transport failures.

Using any number and/or type(s) of algorithm(s), logic and/or method(s), the example maintenance server 155 of FIG. 1 can, additionally or alternatively, process received transport failure alerts and/or values received via the transport failure alerts to determine whether to adjust one or more rules and/or parameters used by the failure detection modules 155 to identify whether a network transport failure has or may have occurred. When one or more rules and/or parameters need to be added, removed or changed, the maintenance server 155 provides the change(s) to the failure detection modules 150 via, for example, the backchannel communication paths 130-132. For example, the maintenance server 155 may determine that the threshold used by the failure detection modules 150 to detect an abrupt change in motion rate is too low leading to an excessive number of false transport failure alerts, and send a larger threshold to the failure detection modules 150.

While an example IPTV-based media presentation system 100 has been illustrated in FIG. 1, the devices, networks, systems, servers and/or processors illustrated in FIG. 1 may be combined, divided, re-arranged, eliminated and/or implemented in any way. Moreover, the example display device 105, the example media device 106, the example media gateway 110, the example IPTV platform 115, the example distribution node 125, the example media server 140, the example failure detection modules 150, the example maintenance server 155 and/or, more generally, the example IPTV system 100 of FIG. 1 may be implemented by hardware, software, firmware and/or any combination of hardware, software and/or firmware. Thus, for example, any or all of the example display device 105, the example media device 106, the example media gateway 110, the example IPTV platform 115, the example distribution node 125, the example media server 140, the example failure detection modules 150, the example maintenance server 155 and/or, more generally, the example IPTV system 100 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example display device 105, the example media device 106, the example media gateway 110, the example IPTV platform 115, the example distribution node 125, the example media server 140, the example failure detection modules 150, the example maintenance server 155 and/or, more generally, the example IPTV system 100 are hereby expressly defined to include a tangible medium such as a memory, a digital versatile disc (DVD), a compact disc (CD), etc. storing the software and/or firmware. Further still, the example IPTV system 100 of FIG. 1 may include additional devices, servers, systems, networks, gateways, portals, and/or processors in addition to, or instead of, those illustrated in FIG. 1 and/or may include more than one of any or all of the illustrated devices, servers, networks, systems, gateways, portals, and/or processors.

Figure 2:
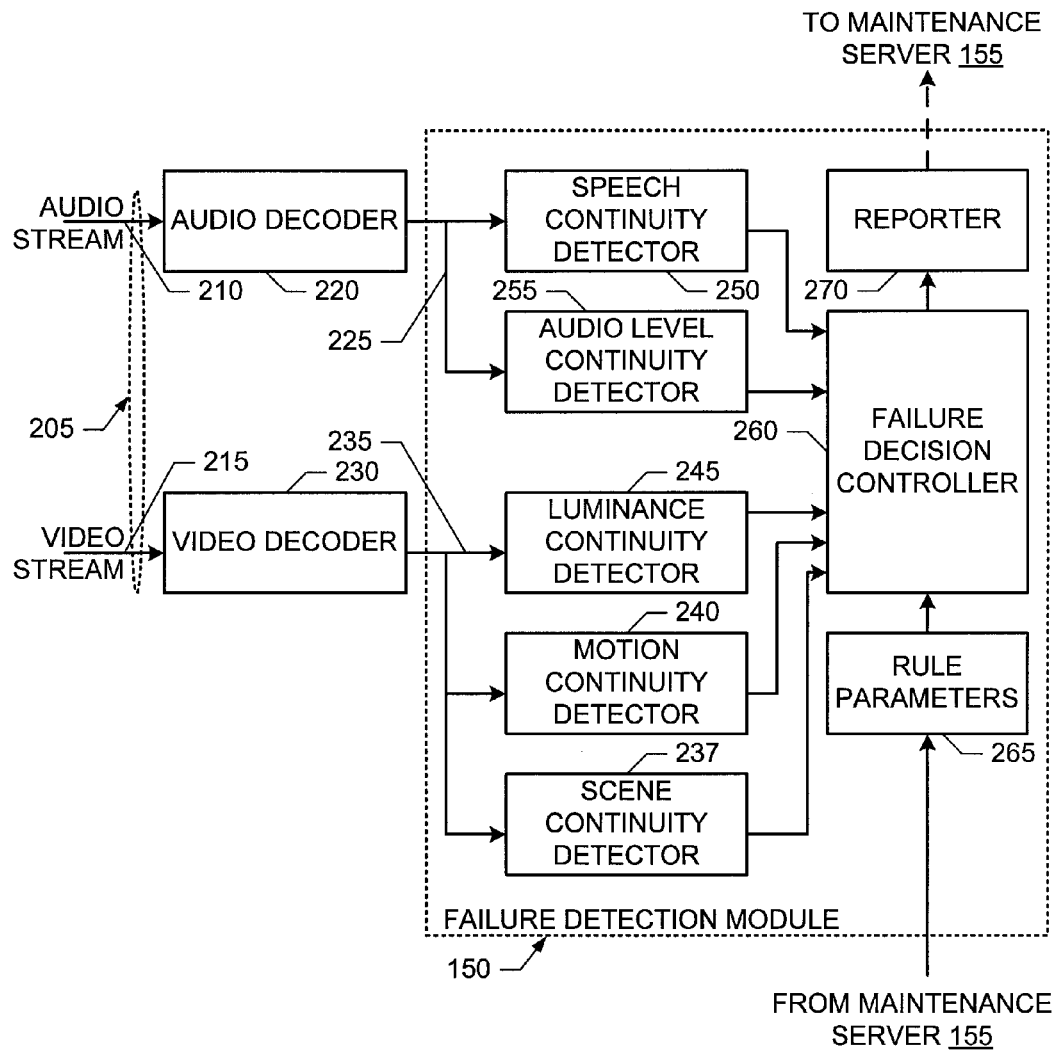
FIG. 2 illustrates an example manner of implementing a failure detection module for the example IPTV-based system of FIG. 1.

FIG. 2 illustrates an example manner of implementing any or all of the example failure detection modules 150 of FIG. 1. The example failure detection module 150 of FIG. 2 determines whether a transport network failure has occurred or has likely occurred based on a media stream 205 corresponding to a particular program that was received from the example IPTV platform 115 of FIG. 1. The example media stream 205 of FIG. 2 includes an audio stream 210 and a video stream 215 that collectively represent a particular program. The example media stream 205 is implemented in accordance with any past, present and/or future standard(s), recommendation(s) and/or specification(s), such as moving pictures expert group (MPEG)-1, MPEG-2, MPEG-4, and/or the International Telecommunications Union-Telecommunications Sector (ITU-T) H.264 standards.

Prior to processing by the example failure detection module 150 of FIG. 2, the example audio stream 210 is decoded by any type of audio decoder 220 to form baseband and/or un-encoded audio data 225. Likewise, the example video stream 215 of FIG. 2 is decoded by any type of video decoder 230 to form baseband, un-encoded and/or pixel-based video data 235. The example video data 235 of FIG. 2 comprises a plurality of video frames each having a plurality of pixels. The example failure detection module 150 could, additionally or alternatively, process the encoded audio stream 210 and/or the encoded video stream 215 to determine whether a network transport failure has occurred. The example decoders 220 and 230 of FIG. 2 are implemented by and/or within the media device 106, the media gateway 110, the distribution node 125 or the media server 140 that implements the failure detection module 150. While the example decoders 220 and 230 are implemented separately from the example failure detection module 150, the failure detection module 150 of FIG. 2 may alternatively implement either or both of the decoders 220 and 230.

To detect scene changes, the example failure detection module 150 of FIG. 2 includes a scene continuity detector 237. Using any number of method(s), logic, and/or algorithm(s), the example scene continuity detector 237 of FIG. 2 identifies scene changes in the video stream 215. For example, the example scene continuity detector 237 can measure and/or count the number of pixels that changed between or across two or more video frames. When a scene change occurs there will be large number of pixels that change between or across two video frames. When the number of pixel changes exceeds a threshold a scene change may have occurred. For each pixel of a video frame, the example scene continuity detector 237 compares the value (e.g., color and/or intensity) of the pixel in the video frame to its value in a preceding video frame by, for example, computing a difference. If the change in the value of the pixel exceeds a threshold, which may be zero, the pixel is considered to have changed and the number of changed pixels is incremented. In some examples, the differences in pixel values are filtered (e.g., using a logarithmic weighting) to reduce the likelihood that noise or interference artificially indicates a scene change.

To detect changes in motion, the example failure detection module 150 of FIG. 2 includes a motion continuity detector 240. The example scene motion continuity detector 240 of FIG. 2 uses motion vectors to identify the amount and/or extent of motion between two video frames. In general, a motion vector represents the distance between two similar blocks of pixels of different video frames. A larger motion vector (e.g., a motion vector having an absolute value or length greater than a threshold) is indicative of a high rate of instantaneous or short-term motion. Likewise, a small motion vector (e.g., a motion vector having an absolute value or length less than a threshold) is indicative of a low rate of instantaneous or short-term motion. The motion rate of the video stream 215 may and/or will vary during a scene but, in the absence of a network transport failure, generally changes in a smooth or continual (i.e., non-abrupt) fashion. As described above, an abrupt decrease in motion rate within a scene (e.g., a difference between two successive motion vectors that exceeds a threshold) may be indicative of a network transport failure. In some examples, differences between motion vectors are filtered (e.g., using a logarithmic weighting) to reduce the likelihood that noise or interference artificially indicates an abrupt change in motion.

To detect changes in luminance, the example failure detection module 150 of FIG. 2 includes a luminance continuity detector 245. Using any number and/or type(s) of algorithm(s), logic and/or method(s), the example luminance continuity detector 245 of FIG. 2 measures and/or computes the luminance of each video frame, and compares the luminance of the video frame to one or more preceding video frames by, for example, computing a difference. An example method of computing the luminance of a video frame comprises computing an average of the luminance of each pixel of the video frame. If the change in average luminance between two video frames exceeds a threshold then a network transport failure may have occurred. In some examples, the luminance values of more than two video frames are filtered (e.g., using a logarithmic weighting) to reduce the likelihood that an intentional luminance change is identified as a network transport failure.

To detect speech discontinuities, the example failure detection module 150 of FIG. 2 includes a speech continuity detector 250. Using any number and/or type(s) of algorithm(s), logic and/or method(s), the example speech continuity detector 250 detects when spoken words are interrupted. For example, the speech continuity detector 250 can identify and/or detect that only the phonemes of a first part of a word are present in the audio stream 210. That is, a set of phonemes represent an incomplete word.

To detect audio level (i.e., volume) changes, the example failure detection module 150 of FIG. 2 includes an audio level continuity detector 255. Using any number and/or type(s) of algorithm(s), logic and/or method(s), the example audio level continuity detector 255 of FIG. 2 measures and/or computes the audio level or volume of the audio stream 210, and compares the volume of a first portion of the audio stream 210 to a second portion of the audio stream 220 by, for example, computing a difference of the volumes. If the change in audio level between two portions of the audio stream 210 exceeds a threshold then a network transport failure may have occurred.

To determine whether a network transport failure has or probably has occurred, the example failure detection module 150 of FIG. 2 includes a failure decision controller 260. The example failure decision controller 260 of FIG. 2 detects and/or identifies network transport failures based on one or more characteristics of the media stream 205 that are computed and/or measured by any or all of the example scene continuity detector 237, the example motion continuity detector 240, the example luminance continuity detector 245, the example speech continuity detector 250 and/or the example audio level continuity detector 255. To reduce the likelihood of the failure decision controller 260 identifying an intentional cinematography effect as a network transport failure, the example failure decision controller 260 utilizes two or more characteristics computed and/or measured by the example scene continuity detector 237, the example motion continuity detector 240, the example luminance continuity detector 245, the example speech continuity detector 250 and/or the example audio level continuity detector 255. In some examples, the example failure decision controller 260 of FIG. 2 uses majority voting to identify a probable network transport failure. For example, the failure decision controller 260 determines that a network transport failure has probably occurred when at least two of the following have occurred: (a) a change in the motion rate exceeds a first threshold without a detected scene change, (b) a change in the luminance exceeds a second threshold, (c) a change in audio level exceeds a third threshold and/or (d) interrupted speech was detected. Additionally or alternatively, the failure decision controller 260 computes a weighted sum of the characteristics computed by the example scene continuity detector 237, the example motion continuity detector 240, the example luminance continuity detector 245, the example speech continuity detector 250 and/or the example audio level continuity detector 255, where the weights adjust the relative priority of each characteristics to identify a probable network transport failure. In some examples, a sum of the weights used to compute a weighted sum may be less than or equal to one.

To store thresholds and weights used by the example failure decision controller 260, the example failure detection module 150 of FIG. 2 includes a rule parameters database 265. The example rule parameter database 265 of FIG. 2 stores one or more values and/or parameters that may be used to determine whether a network transport failure has or probably has occurred. Example values that may be stored in the rule parameters database 265 include, but are not limited to, a scene change detection threshold, a motion vector difference threshold, a luminance change threshold, a phoneme and word dictionary, an audio level change threshold, and/or weights that may be used to compute a weighted sum of characteristics measured and/or computed by any or all of the example scene continuity detector 237, the example motion continuity detector 240, the example luminance continuity detector 245, the example speech continuity detector 250 and/or the example audio level continuity detector 255. Values and/or parameters may be stored in the rule parameters database 265 using any number and/or type(s) of data structures stored in any number and/or type(s) of memory(-ies) and/or memory device(s). Values and/or parameters stored in the rule parameters database 265 may be added, removed and/or changed by the example maintenance server 155 of FIG. 1.

To report network transport failures, the example failure detection module 150 of FIG. 2 includes a reporter 270. When the example failure decision controller 260 determines that a network transport failure has or probably has occurred, the example reporter 270 generates and/or sends a transport failure alert to the maintenance server 155. An example transport failure alert includes values representative of the characteristics used by the failure decision controller 260 to make the network transport failure determination. The example transport failure alert may also include the thresholds or weights used by the failure decision controller 260.

While an example manner of implementing any or all of the example failure detection modules 150 of FIG. 1 has been illustrated in FIG. 2, one or more of the elements, processes and/or devices illustrated in FIG. 2 may be combined, divided, re-arranged, omitted, eliminated and/or implemented in any other way. Further, the example scene continuity detector 237, the example motion continuity detector 240, the example luminance continuity detector 245, the example speech continuity detector 250, the example audio level continuity detector 255, the example failure decision controller 260, the example rule parameters database 265, the example reporter 270 and/or, more generally, the example failure detection module 150 may be implemented by hardware, software, firmware and/or any combination of hardware, software and/or firmware. Thus, for example, any or the example scene continuity detector 237, the example motion continuity detector 240, the example luminance continuity detector 245, the example speech continuity detector 250, the example audio level continuity detector 255, the example failure decision controller 260, the example rule parameters database 265, the example reporter 270 and/or, more generally, the example failure detection module 150 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a failure detection module 150 may include one or more elements, processes and/or devices in addition to, or instead of, those illustrated in FIG. 2, and/or may include more than one of any or all of the illustrated elements, processes and devices. For example, any number and/or type(s) of additional or alternative continuity detectors may be implemented to measure and/or compute additional or alternative media stream characteristics representative of a potential network transport failure.

Figure 3:
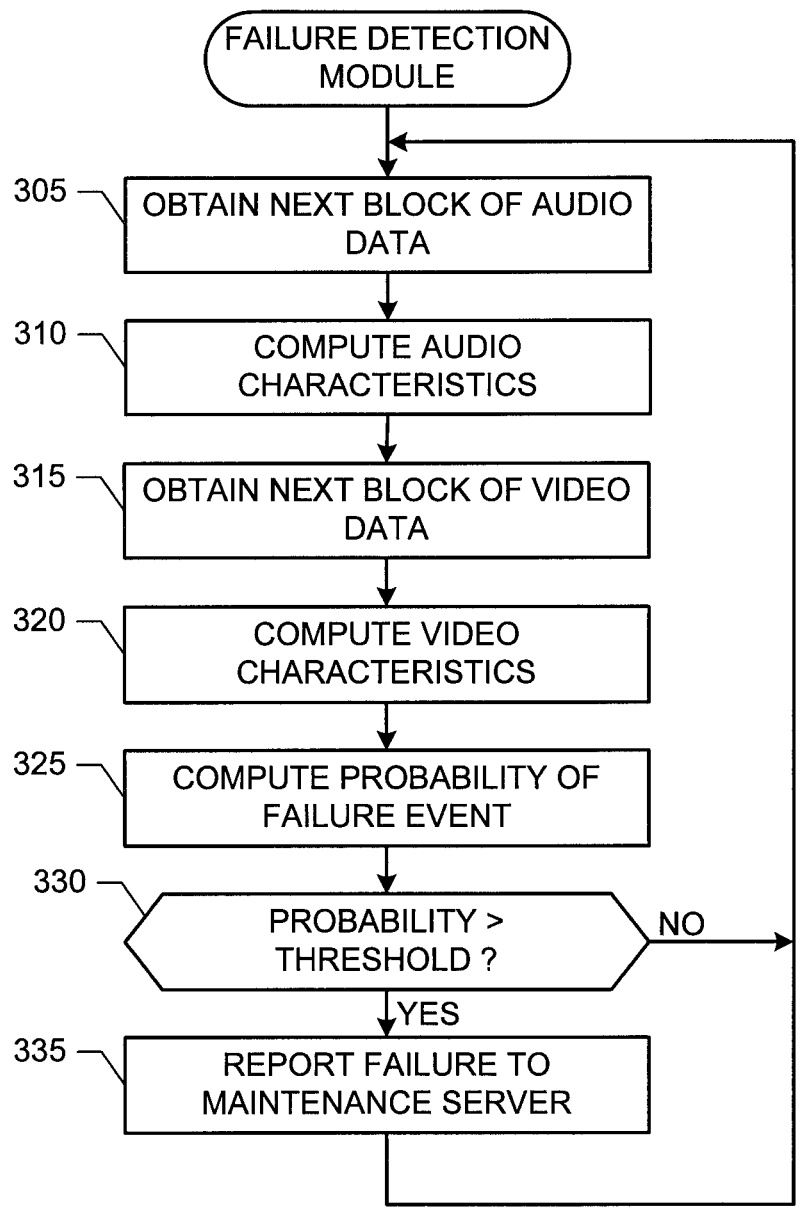
FIG. 3 is a flowchart representative of an example process that may be carried out to implement a failure detection module for the example IPTV-based system of FIG. 1 and/or to implement the example failure detection module of FIG. 2.

FIG. 3 is a flowchart representative of an example process that may be carried out to implement any or all of the example failure detection modules 150 of FIGS. 1 and/or 2. The example process of FIG. 3 may be carried out by a processor, a controller and/or any other suitable processing device. For example, the example process of FIG. 3 may be embodied in coded instructions stored on a tangible medium such as a flash memory, a read-only memory (ROM) and/or random-access memory (RAM) associated with a processor (e.g., the example processor P105 discussed below in connection with FIG. 4). Alternatively, some or all of the example process of FIG. 3 may be implemented using any combination(s) of circuit(s), ASIC(s), PLD(s), FPLD(s), discrete logic, hardware, firmware, etc. Also, some or all of the example process of FIG. 3 may be implemented manually or as any combination of any of the foregoing techniques, for example, any combination of firmware, software, discrete logic and/or hardware. Further, although the example operations of FIG. 3 are described with reference to the flowcharts of FIG. 3, many other methods of implementing the operations of FIG. 3 may be employed. For example, the order of execution of the blocks may be changed, and/or one or more of the blocks described may be changed, eliminated, sub-divided, or combined. Additionally, any or all of the example process of FIG. 3 may be carried out sequentially and/or carried out in parallel by, for example, separate processing threads, processors, devices, discrete logic, circuits, etc.

The example process of FIG. 3 begins with the example audio decoder 220 of FIG. 2 decoding the next portion of the audio stream 210 (lock 305). The example speech continuity detector 250 and/or the example audio level continuity detector 255 compute one or more values representative of characteristics of the audio stream 210 and/or, more generally, the example media stream 205 (block 310).

The example video decoder 230 of FIG. 2 decodes the next portion of the video stream 215 (block 315). The example scene continuity detector 237, the example motion continuity detector 240 and/or the example luminance continuity detector 245 compute one or more values representative of characteristics of the video stream 215 and/or, more generally, the example media stream 205 (block 320).

As described above, the example failure decision controller 260 of FIG. 2 determines the likelihood that a network transport failure has occurred based on one or more characteristics of the media stream 205 that are computed and/or measured by any or all of the example scene continuity detector 237, the example motion continuity detector 240, the example luminance continuity detector 245, the example speech continuity detector 250 and/or the example audio level continuity detector 255 (block 325). The failure decision controller 260 may, for example, uses majority voting or a weighted sum to determine the likelihood that a network transport failure has occurred.

If the likelihood that a network transport failure has occurred exceeds a threshold (block 330), the example reporter 265 of FIG. 2 generates and/or sends a transport failure alert to the example maintenance server 155 of FIG. 1 (block 335). Control then returns to block 305 to process the next portion of the media stream 205. If the likelihood that a network transport failure has occurred does not exceed the threshold (block 330), control returns to block 305 without the reporter 265 generating and/or sending a transport failure alert.

Figure 4:
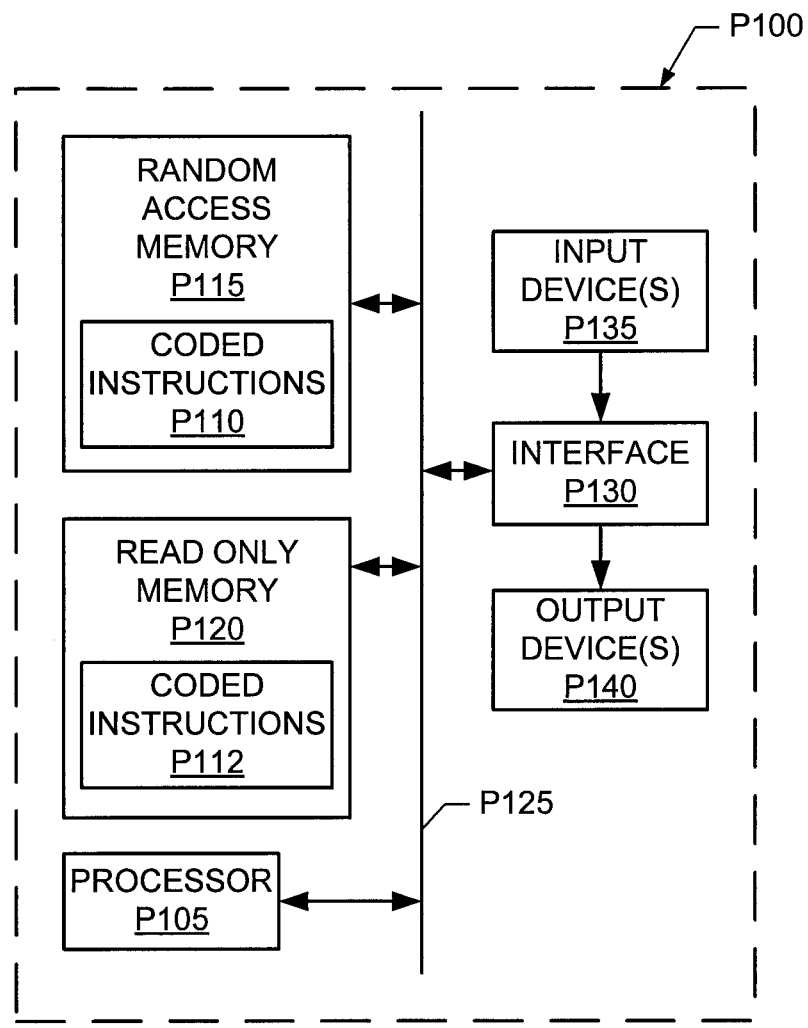
FIG. 4 is a schematic illustration of an example processor platform that may be used and/or programmed to execute the example process of FIG. 3 to implement the example failure detection modules disclosed herein.

FIG. 4 is a schematic diagram of an example processor platform P100 that may be used and/or programmed to implement any or all of the example failure detection modules 150 of FIGS. 1 and/or 2. For example, the processor platform P100 can be implemented by one or more general-purpose processors, processor cores, microcontrollers, etc.

The processor platform P100 of the example of FIG. 4 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller The processor P105 may execute, among other things, the example process of FIG. 3 to implement the example failure detection modules 150 described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example rule parameters database 265 of FIG. 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the example audio decoder 220 of FIG. 2, the example video decoder 230 and/or to exchange information (e.g., transport failure alerts or rule parameter updates) with the example maintenance server 155 of FIG. 1.

Of course, the order, size, and proportions of the memory illustrated in the example systems may vary. Additionally, although this patent discloses example systems including, among other components, software or firmware executed on hardware, such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the disclosure are not limited to such devices, standards and/or protocols. Such systems are periodically superseded by faster or more efficient systems having the same general purpose. Accordingly, replacement devices, standards and/or protocols having the same general functions are equivalents, which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    decoding a media stream to form audio data and pixel data for each of a plurality of video frames;
    computing a first value representative of the media stream over a first set of the video frames using pixel data associated with the first set of the video frames;
    computing a second value representative of the media stream over a second set of the video frames using pixel data associated with the second set of the video frames;
    computing a third value representative of first speech in a first segment of the audio data;
    computing a fourth value representative of second speech in a second segment of the audio data;
    determining a fifth value representative of a likelihood that a transport failure has affected the media stream, the fifth value determined by:
        computing a first difference between the first and second values;
        computing a second difference between the third and fourth values; and
        computing the fifth value as a weighted sum of the first and second differences; and
    comparing the fifth value to a threshold to determine whether to generate a transport failure alert.

2. A method as defined in claim 1, further comprising:
    computing a sixth value representative of a first luminance in the first set of the video frames; and
    computing a seventh value representative of a second luminance in the second set of the video frames, wherein the fifth value is further determined using the sixth and seventh values, the first value is representative of a first interframe change range, the second value is representative of a second interframe change rate, and the second difference is representative of at least one of interrupted speech or silence.

3. A method as defined in claim 2, wherein the fifth value is further determined by:
    computing a third difference between the sixth and seventh values; and
    computing the fifth value as a weighted sum of the first, second and third differences.

4. A method as defined in claim 2, wherein the fifth value is further determined by:
    comparing the first difference to a second threshold to determine an eighth value;
    comparing the second difference to a third threshold to determine a ninth value;
    computing a third difference between the sixth and seventh values;
    comparing the third difference to a fourth threshold to determine a tenth value; and
    computing the fifth value as a weighted sum of the eighth, ninth and tenth values.

5. A method as defined in claim 2, wherein the fifth value is further determined by:
    computing a third difference between the sixth and seventh values; and
    setting the fifth value to a value exceeding the threshold when a majority of the first, second and third differences are representative of a possible transport failure.

6. A method as defined in claim 1, wherein the fifth value exceeds the threshold and the transport failure alert is sent when the first value is representative of high-motion video, the second value is representative of still-motion video, the third value is representative of speech and the fourth value is representative of at least one of interrupted speech or silence.

7. A method as defined in claim 1, wherein computing the fourth value comprises:
  detecting a first phoneme of a spoken word in the audio data; and
  determining whether a subsequent phoneme of the spoken word is absent in the audio data.

8. A method as defined in claim 1, further comprising determining whether a scene change occurred; and wherein determining the fifth value comprises not using the first and second values when the scene change occurred.

9. An apparatus comprising:
  a video decoder to decode a media stream to form pixel data for each of a plurality of video frames;
  an audio decoder to decode the media stream to form audio data;
  a motion continuity detector to compute a first value representative of the media stream over a first set of the video frames using pixel data associated with the first set of the video frames, and a second value representative of the media stream over a second set of the video frames using pixel data associated with the second set of the video frames;
  a speech continuity detector to compute a third value representative of first speech in a first segment of the audio data, and a fourth value representative of second speech in a second segment of the audio data; and
  a failure decision controller to determine a fifth value representative of a likelihood that a transport failure has affected the media stream and to compare the fifth value to a threshold to determine whether to generate a transport failure alert, the fifth value determined by:
    computing a first difference between the first and second values;
    computing a second difference between the third and fourth values; and
    computing the fifth value as a weighted sum of the first and second differences.

10. An apparatus as defined in claim 9, further comprising:
  a luminance continuity detector to compute a sixth value representative of a first luminance in the first set of the video frames, and a seventh value representative of a second luminance in the second set of the video frames, wherein the failure decision controller is to further determine the fifth value using the sixth and seventh values, the first value is representative of a first interframe change range, the second value is representative of a second interframe change rate, and the second difference is representative of at least one of interrupted speech or silence.

11. An apparatus as defined in claim 10, wherein the failure decision controller is to further determine the fifth value by:
  computing a third difference between the sixth and seventh values; and
  computing the fifth value as a weighted sum of the first, second and third differences.

12. An apparatus as defined in claim 10, wherein the failure decision controller is to further determine the fifth value by:
  computing a third difference between the sixth and seventh values; and
  setting the fifth value to a value exceeding the threshold when a majority of the first, second and third differences are representative of a possible transport failure.

13. An apparatus as defined in claim 9, wherein the fifth value exceeds the threshold and the transport failure alert is sent when the first value is representative of high-motion video, the second value is representative of still-motion video, the third value is representative of speech and the fourth value is representative of at least one of interrupted speech or silence.

14. An apparatus as defined in claim 9, wherein the speech continuity detector is to compute the fourth value by:
  detecting a first phoneme of a spoken word in the audio data; and
  determining whether a subsequent phoneme of the spoken word is absent in the audio data.

15. An apparatus as defined in claim 9, further comprising a scene continuity detector to determine whether a scene change occurred, wherein the failure decision controller is to determine the fifth value without using the first and second values when the scene change occurred.

16. A storage device comprising machine readable instructions which, when executed, cause a machine to perform operations comprising:
  decoding a media stream to form audio data and pixel data for each of a plurality of video frames;
  computing a first value representative of the media stream over a first set of the video frames using pixel data associated with the first set of the video frames;
  computing a second value representative of the media stream over a second set of the video frames using pixel data associated with the second set of the video frames;
  computing a third value representative of first speech in a first segment of the audio data;
  computing a fourth value representative of second speech in a second segment of the audio data;
  determining a fifth value representative of a likelihood that a transport failure has affected the media stream, the fifth value determined by:
    computing a first difference between the first and second values;
    computing a second difference between the third and fourth values; and
    computing the fifth value as a weighted sum of the first and second differences; and
  comparing the fifth value to a threshold to determine whether to generate a transport failure alert.

17. A storage device as defined in claim 16, wherein the operations further comprise:
  computing a sixth value representative of a first luminance in the first set of the video frames; and
  computing a seventh value representative of a second luminance in the second set of the video frames, wherein determining the fifth value is further comprises using the sixth and seventh values, the first value is representative of a first interframe change range, the second value is representative of a second interframe change rate, and the second difference is representative of at least one of interrupted speech or silence.

18. A storage device as defined in claim 17, wherein determining the fifth value comprises:
  computing a third difference between the sixth and seventh values; and
  setting the fifth value to a value exceeding the threshold when a majority of the first, second and third differences are representative of a possible transport failure.

19. A storage device as defined in claim 16, wherein the fifth value exceeds the threshold and the transport failure alert is sent when the first value is representative of high-motion video, the second value is representative of still-motion video, the third value is representative speech and the fourth value is representative at least one of interrupted speech or silence.

20. A storage device as defined in claim 16, wherein computing the fourth value comprises:
   detecting a first phoneme of a spoken word in the audio data; and
   determining whether a subsequent phoneme of the spoken word is absent in the audio data.

* * * * *